(12) United States Patent
Smith et al.

(10) Patent No.: US 6,448,984 B1
(45) Date of Patent: *Sep. 10, 2002

(54) DISPLAYING LAYERED INFORMATION USING LENTICULAR-LIKE INTERFACES

(75) Inventors: Kim C. Smith, Colleyville; Michael P. Mostyn, Flower Mound, both of TX (US)

(73) Assignee: Amiga Development LLC, North Sioux City, SD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,901
(22) Filed: Jan. 5, 1998
(51) Int. Cl.$^7$ ................................. G06F 3/00
(52) U.S. Cl. ...................... 345/781; 345/790; 345/802
(58) Field of Search ................ 345/344, 343, 345/345, 346, 342, 340, 435, 427, 790, 802, 803, 804, 798, 799, 800, 781, 419, 629

(56) References Cited

U.S. PATENT DOCUMENTS

| | | | |
|---|---|---|---|
| 5,651,107 A | | 7/1997 | Frank et al. ................ 395/344 |
| 5,745,665 A | * | 4/1998 | Pasco ......................... 345/427 |
| 5,805,163 A | * | 9/1998 | Bagnas ....................... 345/345 |
| 5,867,322 A | * | 2/1999 | Morton ....................... 359/619 |
| 6,285,368 B1 | * | 9/2001 | Sudo .......................... 345/418 |
| 6,329,987 B1 | * | 12/2001 | Gottfried et al. ........... 345/419 |
| 6,366,281 B1 | * | 4/2002 | Lipton et al. ............... 345/419 |

OTHER PUBLICATIONS

"Graphical Technique to Access Hidden Information", *Research Disclosure*, No. 300, (Apr. 1989).
"Method for Providing Different Display Modes for an Object/Object Set", *IBM technical Disclosure Bulletin*, XP–002101076 vol. 28, No. 2, 1, (Jul. 1985).

* cited by examiner

Primary Examiner—Kristine Kincaid
Assistant Examiner—Sy D. Luu
(74) Attorney, Agent, or Firm—Rodney L. Lacy

(57) ABSTRACT

A method of displaying graphical information using a "lenticular-like" interface is described. With a "lenticular-like" interface, the viewer is made aware that additional, usually complementary information is available besides that which is currently foregrounded in the display. This is accomplished by displaying a small but characteristic portion of the actual secondary field. In another embodiment the dominant field is made to look like a lenticular lens, which suggests to the user that a slight shift in view will bring the secondary field to the foreground. With a "lenticular-like" interface, this shift is accomplished by moving the cursor from one edge of the display field to the other edge.

30 Claims, 7 Drawing Sheets

DISPLAYING LAYERED INFORMATION USING LENTICULAR-LIKE INTERFACES

RELATED APPLICATIONS

This application relates to the co-pending, co-filed, and co-assigned applications entitled "System for using a channel and event overlay for invoking channel and event related functions," Ser. No. 09/002,987, filed Jan. 5, 1998 "Multipurpose channel banner," Ser. No. 09/002,733 filed Jan. 5, 1998 "Controlling the layout of graphics in a television environment," Ser. No. 09/002,994, filed Jan. 5, 1998 now U.S. Pat. No. 6,201,538 and "Mutatably transparent displays," Ser. No. 09/002,986, filed Jan. 5, 1998 now U.S. Pat. No. 5,933,141 all of which are hereby incorporated by reference.

TECHNICAL FIELD OF THE INVENTION

The present invention relates generally to graphical displays and in particular to a method of displaying layered information using "lenticular-like" interfaces.

BACKGROUND OF THE INVENTION

A typical problem in interface design is to convey to the user the existence of a secondary level of information or functionality beyond that currently presented on a screen. For example, a top level menu displayed on command by the user allows for selection of particular functions that are provided in more detail on lower level menus presented independently from the top level menu. To notify the user of these additional menu choices, buttons or menu items variously labeled with text, icons, arrows or with the presence of scroll bars are used. Because screen real estate is generally at a premium, there is often more pertinent content than can be displayed at any given time.

Some current ways of indicating to the viewer the availability of additional content, beyond that which is presently displayed include: 1) an ellipsis ( . . . ) following a word or phrase, 2) arrows pointing past the boundary of a cell or window, 3) a "more" button, 4) a cascade of overlapping windows, and 5) the presence of scroll bars. All five current methods of indicating to the viewer the availability of additional content, beyond that which is presently displayed, are useful to indicate some general continuation of a list, line of text or document, etc.

Although some of these solutions may use icons to represent the type of content available, none use an actual part of the field to represent the additional information. If an actual part of the secondary field were viewed as part of the foregrounded field, the viewer would unmistakenly realize that additional, usually complementary information is available besides that which is currently displayed.

Therefore, there is a need to convey to the user the existence of a secondary information or functionality along with the nature of that information or functionality. Specifically, there is a need to display an easily recognizable portion of the secondary field to represent additional menu choices available to the user.

SUMMARY OF THE INVENTION

The above mentioned shortcomings as well as other problems are addressed by the present invention which will be understood by reading and studying the following specification. The invention describes a computerized system for presenting a secondary level of information to a viewer while maximizing limited screen space.

In one embodiment of the invention, the computerized system comprises a processor, a computer-readable medium, a display device, and an application program. The application program is executed by the processor from the computer-readable medium, wherein the program provides a primary view over the display device and a "lenticular-like" view slidably positioned over the primary view on the display device. The "lenticular-like" view is slidably positioned over the primary view by a pointing device, such as a mouse.

In another embodiment, an information handling system comprises a display device, and a graphical user interface such that the graphical user interface is configured for viewing on the display device a primary view and a "lenticular-like" view. A portion of the contents of the "lenticular-like" view are displayed concurrently with the contents of the primary view such that the primary view occupies a greater portion of the display device than the "lenticular-like" view. The contents of the "lenticular-like" view is slidably positioned over the contents of the primary view by a pointing device. This causes the "lenticular-like" view to occupy a greater portion of the display device than the primary view.

The invention allows the display of graphical information using a "lenticular-like" interface that is an analogy of a real-world lenticular display. With a lenticular-like interface, the viewer is made aware that secondary information, usually complementary in nature, is available besides that which is currently foregrounded in the display. This invention is particularly beneficial wherever interactive content is displayed on a screen and where screen real estate is at a premium.

Conceptually, one embodiment of the invention is concerned with two fields of information, just as a real-world lenticular display may be concerned with the display of two distinct images. In this embodiment of the invention, one field is primary (or the default view), and the other field is secondary. And, just as in a real-world lenticular display the "lenticular" (lens) may mediate between the display of two images, in this embodiment of the present invention a computer implemented analogy of a real-world "lenticular" mediates between the two fields of information. The "lenticular" of this embodiment is thus not a part of either field, but rather is a software construct relating these two fields to each other. Both fields will exhibit "lenticular-like" artifacts in their construction, although it requires the conjunction of the two "lenticular-like" fields to create the effect.

Utilization of a "lenticular like" interface allows the viewer to be made aware that additional, usually complementary information is available besides that which is currently foregrounded in a display. This is accomplished by displaying a small but characteristic portion of the actual secondary field. Another way to accomplish the present invention is to make the dominant field look like a lenticular lens, which suggests to the user that a slight shift in view will bring the secondary field to the foreground. With a "lenticular-like" interface, this shift is accomplished by moving the cursor from one edge of the display field to the other edge. In different embodiments of the invention, computers, computerized systems and computer-readable media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Embodiments of the present invention are amenable to inclusion into and/or development in conjunction with a software architecture of a computerized convergence system as described in co-filed and co-assigned application titled "Architecture for Convergence Systems," which is hereby incorporated by reference.

Figure 1:
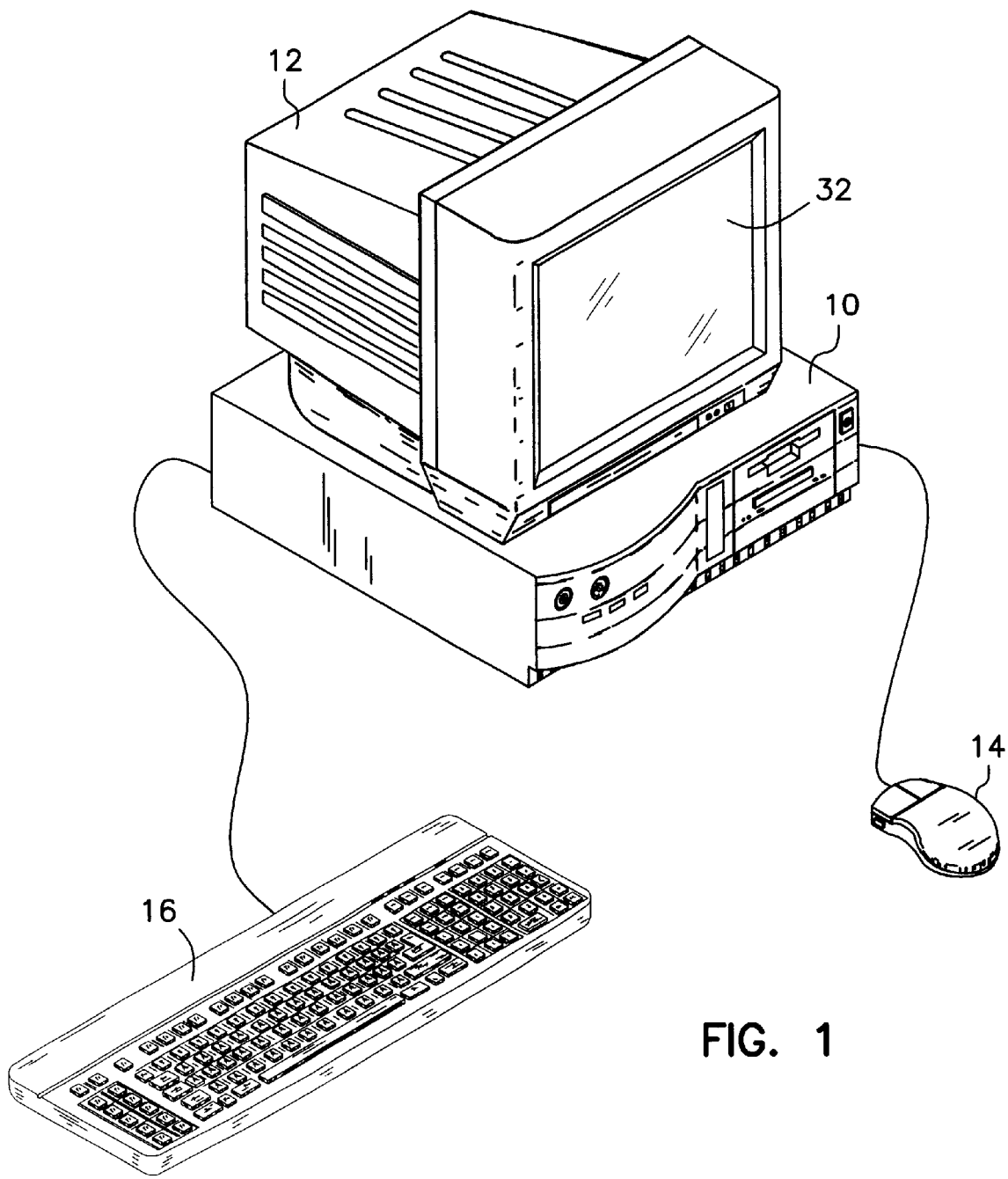
FIG. 1 is a diagram of a typical computer system in conjunction with which embodiments of the invention may be implemented.

Referring first to FIG. 1, a diagram of a typical computer in conjunction with which embodiments of the invention may be implemented is shown. Computer 10 is coupled to monitor 12 having display surface 32, pointing device 14, and keyboard 16. Computer 10 includes a processor (for example, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 10. A digital processing system, such as a computer 10, is preferably is a PC-compatible computer running a an operating system such as a version of Microsoft Windows. The construction and operation of such computers are well known within the art.

Computer 10 may be communicatively connected to the Internet. Internet connectivity is well known within the art. In one embodiment, the computer includes a modem and corresponding communication drivers to connect to the Internet via what is known in the art as a "dial-up connection." In another embodiment, the computer includes an Ethernet or similar hardware card to connect to a local-area network (LAN) that itself is connected to the Internet via what is known in the art as a "direct connection" (e.g., T1 line, etc.).

Computer 10 also has at least one hypertext-markup-language (HTML) operating environment running thereon, which may utilize the Internet connectivity. Such operating environments are typically software such as Netscape Navigator and Microsoft Internet Explorer, both of which provide an HTML operating environment, and also access to the Internet's world-wide web (WWW), Usenet newsgroups, and electronic mail features. The invention is not limited to any particular HTML operating environment, however, and the construction and use of such operating environments are well known within the art.

Monitor 12 permits the display of information for viewing by a user of the computer. The invention is not limited to any particular monitor 12. Such monitors include cathode ray tube (CRT) displays, as well as flat panel displays such as liquid crystal displays (LCD's). Pointing device 14 permits the control of the display surface pointer provided by the graphical user interface of operating systems such as versions of Microsoft Windows. The invention is not limited to any particular pointing device 14. Such pointing devices include mouses, touch pads, trackballs, and point sticks. In one embodiment, computer 10 is a Gateway 2000, Inc., desktop personal computer, monitor 12 includes a super-VGA CRT display, and pointing device 14 is a mouse. Finally, keyboard 16 permits entry of textual information into computer 10, as known within the art, and the invention is not limited to any particular type of keyboard.

In comparison to the present invention, an actual lenticular lens (not shown) encodes two or more fields of information into a single display. The different fields are accessed by slightly changing the angle of view. For instance, this may be accomplished by movement of the observer's head from side to side. Alternatively, the lenticular lens itself could be repositioned to achieve the same results.

In contrast to the actual lenticular lens just described, a "lenticular-like" interface identified by the present invention is implemented via two different embodiments; one embodiment uses a "lenticular-like" multi-graphic imagine alteration, while the alternative embodiment uses gradient degrees of transparency/opacity (also referred to as "ghosting"). Both of these versions are addressed below.

Figure 2A:
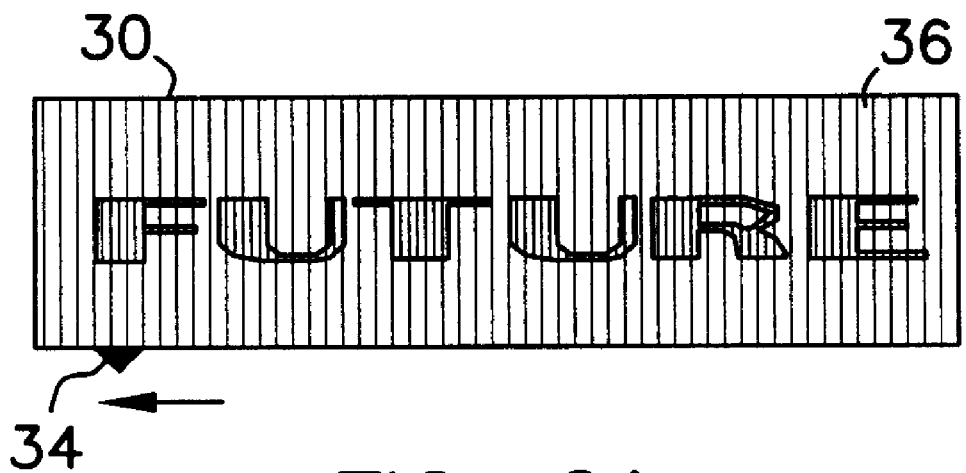
FIGS. 2(a)–(b) are a representation of a "lenticular-like" interface showing a "striping" effect.

Referring first to FIG. 2(a), one embodiment of the present invention is a "lenticular-like" interface 30 having a "striping" effect. Interface 30 is viewed on display surface 32 via monitor 12. Lenticular-like interface 30 is designed to convey to a viewer that a secondary level 38 of additional information is available besides that which is currently foregrounded in the display of field 36. This is particularly applicable when display surface 32 real estate is at a premium, and there is often more pertinent information that can reasonably be displayed at any given time. In many situations, the information to be conveyed is usually complementary to the displayed information.

Figure 2B:
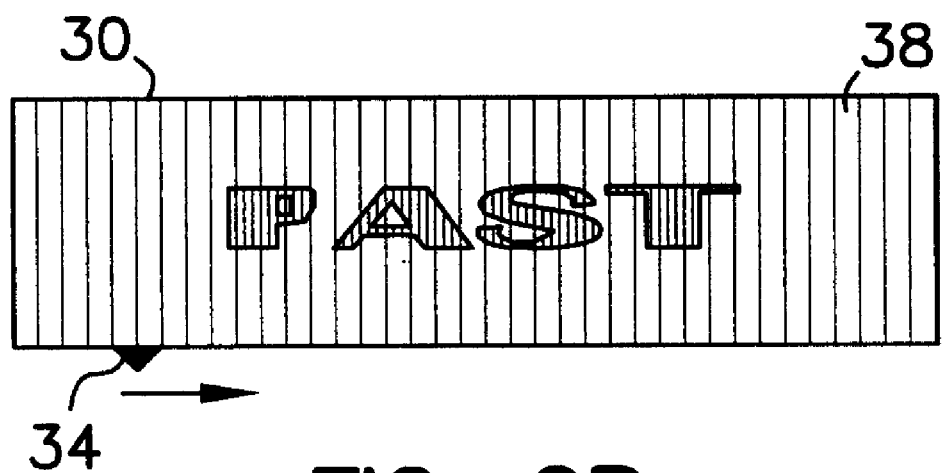

The fact that the dominant field 36 has a "striping" effect helps to makes interface 30 look like an actual lenticular lens, which then suggests to the viewer a slight shift in view will bring the secondary field within view. With "lenticular-like" interface 30, this shift is accomplished by moving cursor 34 a small distance. Moving cursor 34 a slight distance produces secondary field of information 38, as shown in FIG. 2(b). Moving cursor 34 a slight distance back again changes "lenticular-like" interface 30 back to dominate field 36 of FIG. 2(a). Rolling cursor 34 across interface 30 immediately has the effect of exposing secondary field 38 as shown in FIG. 2(b). For instance, content A of primary field 36, as represented by the word "FUTURE" in FIG. 2(a), is revealed when cursor 34 rolls to the left, and content B, as represented by the word "PAST" in FIG. 2(b), is revealed when cursor 34 rolls to the right. Continuing to roll cursor 34 left leaves content A revealed. Furthermore, stopping cursor 34 without rolling right would continue to leave content A revealed. However, to reveal content B, cursor 34 is rolled right, or rolled continuously right, or stopped without rolling back left. Rolling cursor 34 tightly back and forth causes the two content fields 36,38 to oscillate in exposure.

The use of "striping" to create this "lenticular-like" appearance for interface 30 is well known to one skilled in the art, as well as implementation of cursor 34 to alternate between dominate field 36 and secondary field 38.

Figure 3A:
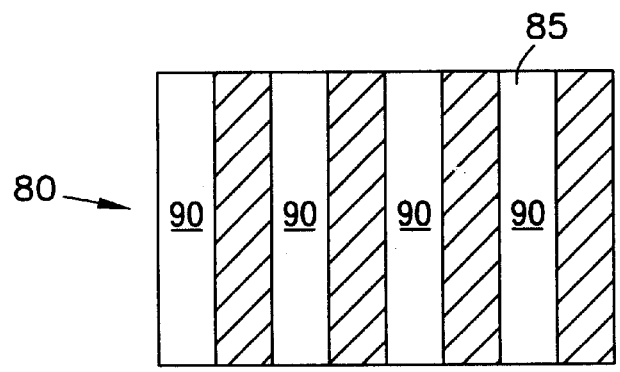
FIGS. 3(a)–(c) illustrate a method of accomplishing a "striping" effect.
Figure 3B:
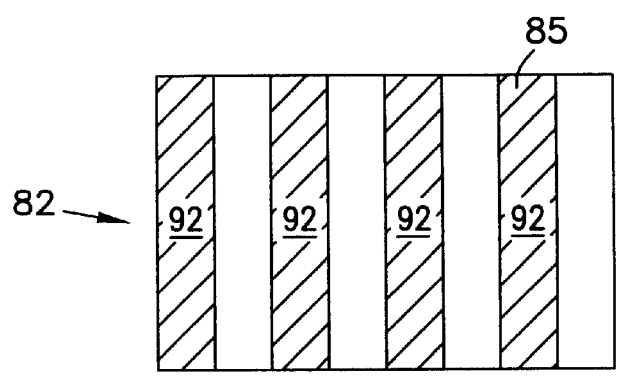
Figure 3C:
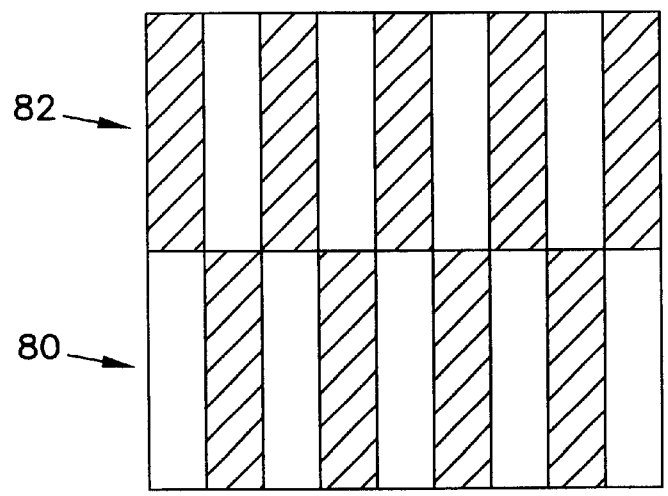

There are two basic ways to accomplish "striping." In reference to FIGS. 3(a)–(c), one such method has two fields 80,82 to be merged into a "lenticular-like" interface, wherein each field 80,82 has stripes 85 applied to them in a regular fashion so as to alternatively hide/expose a portion of the field 80, 82.

If field 80 in FIG. 3(a) is striped in a sequence beginning with an exposed portion 90 (e.g., exposed, hidden, exposed, etc.), then field 82 in FIG. 3(b) is striped in a sequence beginning with a hidden portion 92 (e.g., hidden, exposed, hidden, etc.). The "lenticular-like " effect is thus accomplished by swapping field 82 for field 80 and vise-versa, as illustrated in FIG. 3(c).

As an alternative embodiment to the above described method for creating stripes, the method is done "on-the-fly" with any two fields of the same size and portion. This method consists of taking available content "x," placing it into field 80, applying a stripe mask to field 80 and then saving it. Next, perform the same steps for content "y" using field 82 and applying a stripe mask to field 82. The lenticular effect is thus accomplished by swapping these two stripe mask areas together. Stripe masks could also be generated on-the-fly to accommodate fields of varying sizes.

Figure 4A:
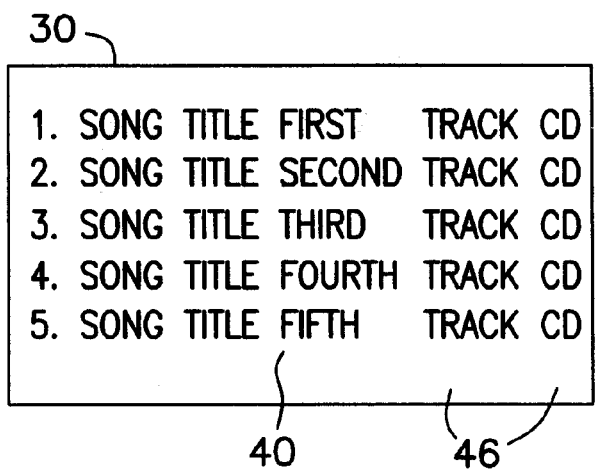
FIGS. 4(a)–(c) illustrate another method of accomplishing a "striping" effect.
Figure 4B:
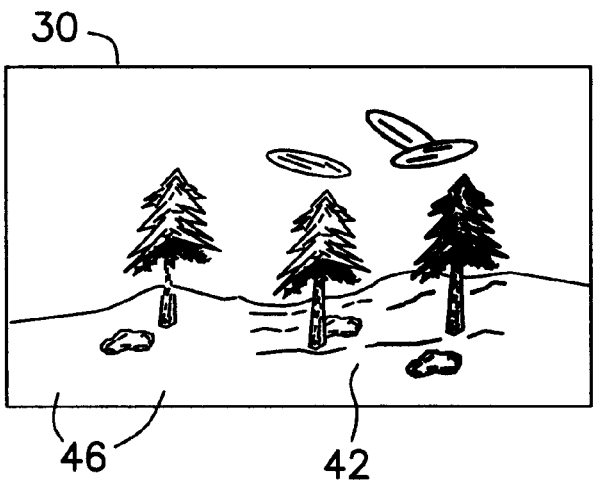
Figure 4C:
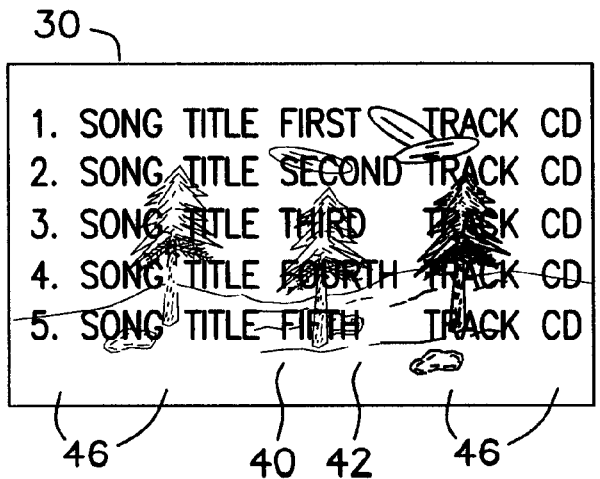

A second method of striping consists of fabricating a (merged) field consisting of alternating sections of fields 80 and 82, as illustrated in FIGS. 4A–C. The lenticular effect is created by shifting the position of a mask having stripes 85 so as to alternatively reveal either all the 80 field sections or all of the 82 field sections. This method could be done on-the-fly as well, as described above.

Another embodiment of the present invention is represented by FIGS. 5 and 7, which illustrate a "lenticular-like" interface 30 showing a "ghosting" effect at margins 46. Margins 46 alternate on either side of field 30, depending upon whether dominant field 40 or secondary field 42 is primarily in view. In either case, dominant field 40 and a portion of secondary field 42 are simultaneously visible.

Neither dominant field 40 nor secondary field 42 entirely dominates interface 30, but the foregrounded interface 30 is entirely free of artifacts, such as a "ridging" or "striping" effect. A portion of secondary field 42 is always visible to indicate its availability, and some portion of that content is actually displayed, so that the nature of secondary field 42 is declared very directly without the use of labels, icons or even guessing. To access fields 40 or 42 requires movement of cursor 34. Movement of cursor 34 is generally greater than that required to change between the dominant and secondary fields 36,38 in the first embodiment of the present invention.

In other words, the alternative embodiment of the present invention is basically a method of displaying graphical information using gradient degrees of transparency/opacity to create the "ghosting" artifact between dominant field 40 and secondary field 42. The creation of this ghosting effect for field 30 is well known to one skilled in the art.

Figure 5A:
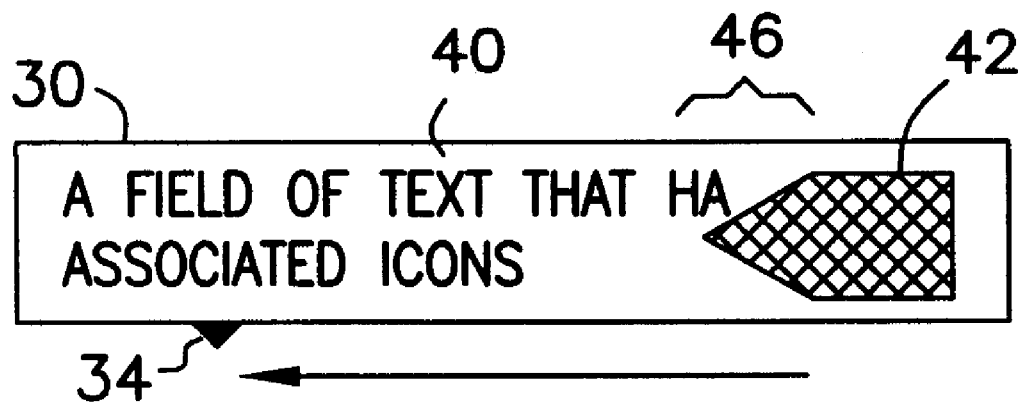
FIGS. 5(a)–(b) are a representation of an alternative embodiment of a "lenticular-like" interface showing a "ghosting" effect at the margins.
Figure 5B:
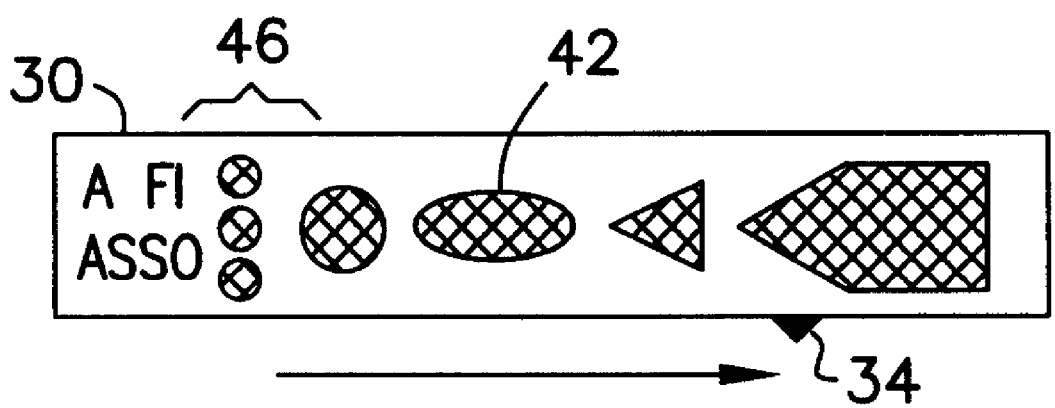

With cursor 34 moved to the left of interface 30, as shown in FIG. 5(a), dominant field 40 fills approximately 90% of interface 30 originating from the left hand side, while secondary field 42 fills a narrow corridor along the right hand side of interface 30. When cursor 34 is moved to the right of interface 30, as shown in FIG. 5(b), secondary field 42 now fills 90% of the right hand side of interface 30, while dominant field 40 fills a narrow corridor along the left hand side of interface 30.

Regardless of whether dominant field 40 or secondary field 42 fills the narrow corridor of interface 30, fields 40 or 42 appear to fade through the present field occupying approximately 90% of interface 30. This fading region is referenced as transitional area 46. This effect of fading through may be enhanced with a "lenticular-like" artifact— the regular "ridging" or "striping" of interface 30 presented earlier. When the cursor moves across "lenticular-like" interface 30, the displayed fields 40, 42 change to indicate that the embedded field can be exposed by rolling cursor 34 over the narrow corridor of its exposure.

In other words, rolling cursor 34 over the 10% exposure of secondary field 42 causes it to transition to 90% exposure, simultaneously shrinking primary field's 40 exposure to 10%, and vice-versa when cursor 34 is moved in the opposite direction. The 90% and 10% figures used for the amount of primary and secondary fields 40,42 displayed are not to be taken literally, but only as examples for implementation of the present invention, and may vary according to any desired percentages. (Note that the "lenticular-like " effect is accomplished not just by the percentages of pass through or block in the intensity mask, but by flipping the mask horizontally, as well, to reveal more or less of one or the other fields.)

Figure 6A:
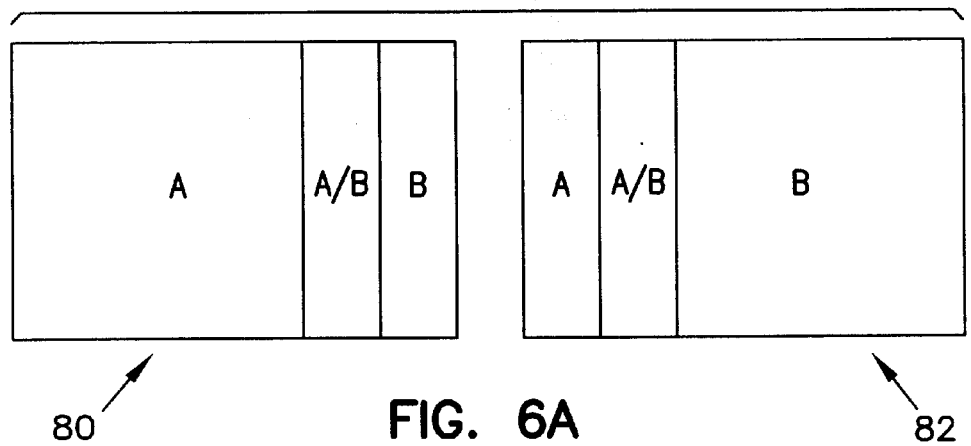
FIGS. 6(a)–(b) illustrate a method of showing a "ghosting" effect.

There are two methods of accomplishing "ghosting." As illustrated in FIG. 6(a), two fields 80 and 82 are created. Field 80 exposes most of content A, a small piece of content B and a blend of fields A and B in a narrow region between the two. The "lenticular-like" effect is produced by swapping out field 80 for field 82 and vice-versa.

Figure 6B:
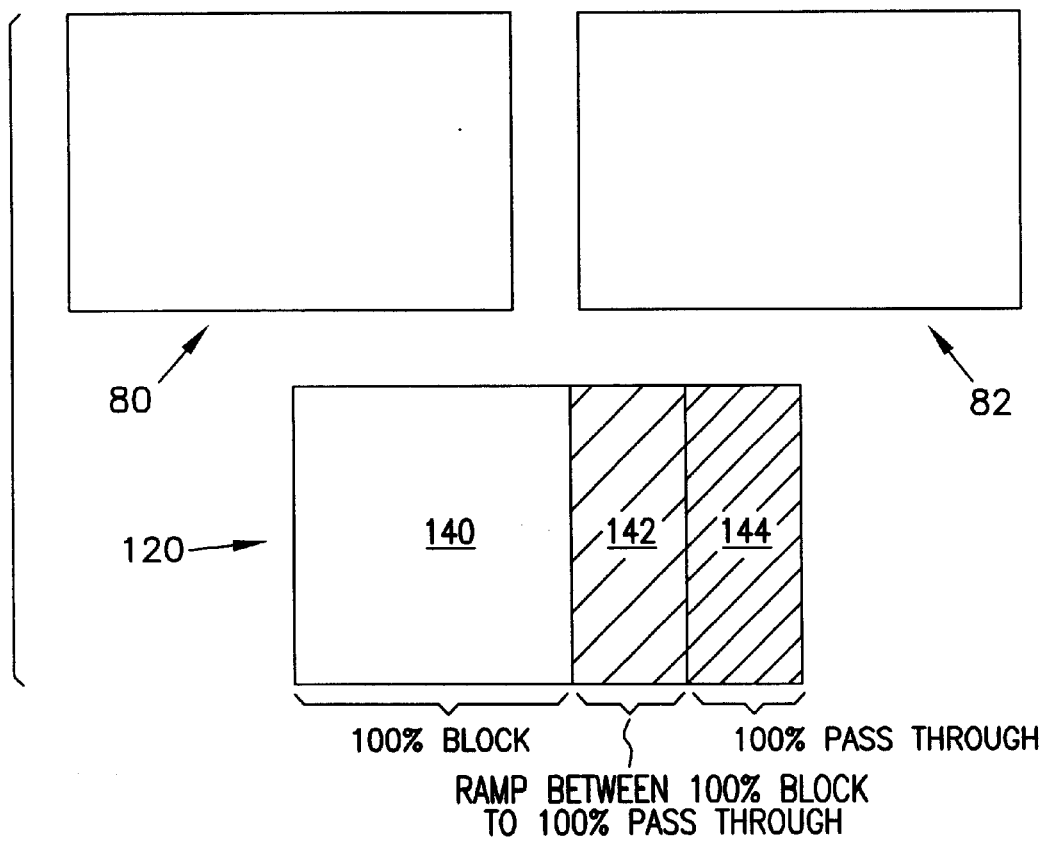

To perform "ghosting" on-the-fly, any two fields 80, 82 of the same size and proportion can be merged using a prefabricated (or created on-the-fly) intensity mask 120. This method is illustrated in FIG. 6(b). The "lenticular-like" effect is accomplished by the percentage of exposure (pass through or block) each field will be permitted. For example, section 140 blocks 100%, section 144 permits a 100% pass through while section 142 varies between the two outer sections 140, 144.

An exemplary application of the present invention involves layering a television program description over/ beneath an active TV window in an electronic program guide. An electronic program guide combines multiple sources of television program guide data delivered through different media into a coherent database. Electronic program guides are well known to one skilled in the art. Another exemplary application might involve layering a CD's song list over/beneath the image of its album cover in the electronic program guide, as particularly shown in FIGS. 7(a) –(c).

Figure 7A:
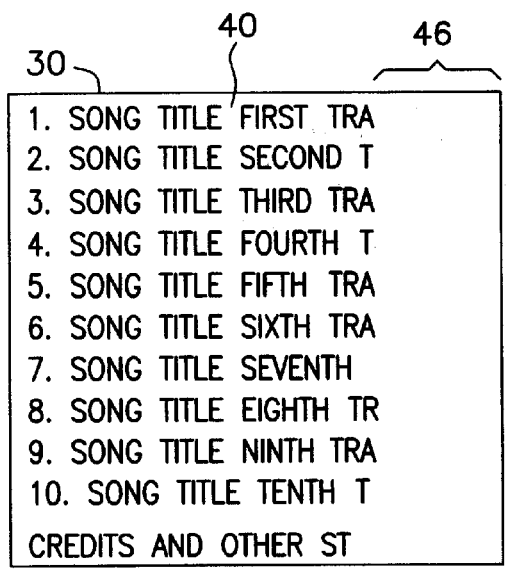
FIGS. 7(a)–(c) are another representation of the alternative embodiment of a "lenticular-like" interface showing a "ghosting" effect at the margins.
Figure 7B:
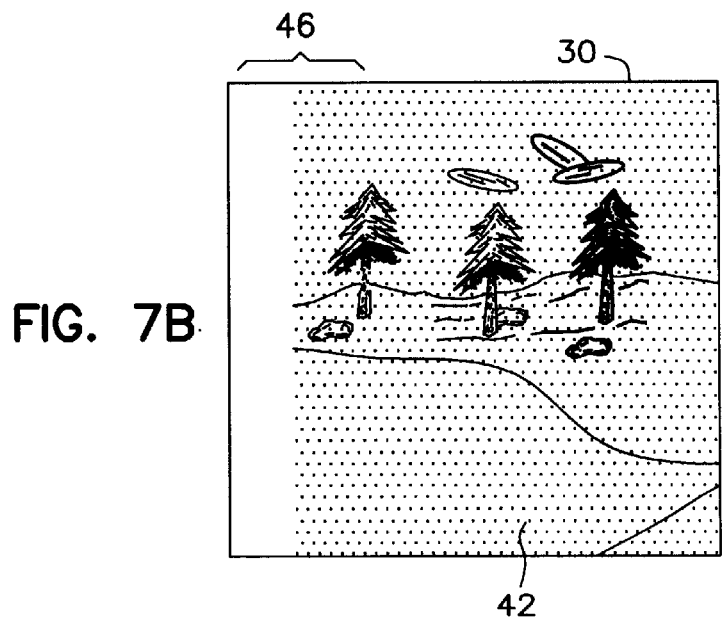
Figure 7C:
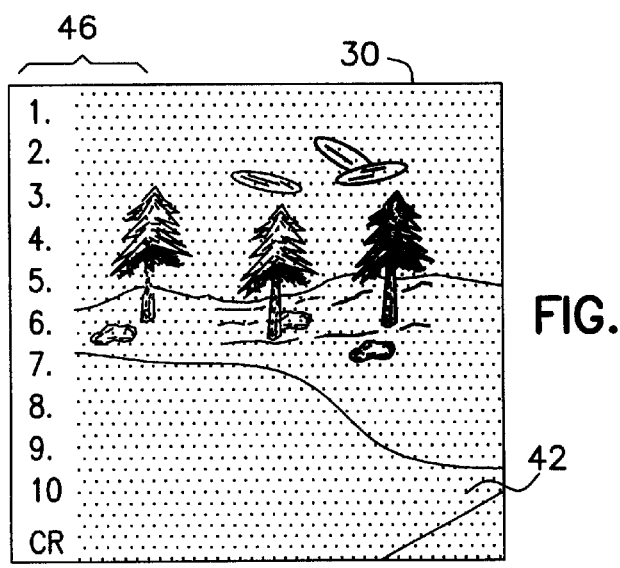

Referring to FIG. 7(a), field 40 fills approximately 90% of interface 30 originating from the left hand side. Field 40 fades as it approaches the right hand side of interface 30. In FIG. 7(b), field 42 fills approximately 90% of interface 30 originating from the right hand side. Field 42 fades as it approaches the left hand side of interface 30. Now referring to FIG. 7(c), the fields 40, 42 are superimposed over each other to create a "lenticular-like" interface.

Still another exemplary application might involve layering television channel logos, call letters, call numbers and unlocked/locked status icons over/beneath a program title. An advantage of this latter example is that the channel logo might be entirely recognizable even though only partially visible, providing information without taking up its maximum display surface exposure. In any of these examples, rolling cursor 34 over the 10% exposure of either text or imagine would cause it to transition to 90% while its complement transitioned from 90% back to 10%. Again, the 90% and 10% dominant and secondary field 40,42 percentages are only selected as illustrative examples.

A method of displaying graphical information using "lenticular-like" multigraphic image alterations and a method of displaying graphical information using gradient degrees of transparency/opacity (ghosting) has been described. Both methods fit a specialized role in that a complementary field of information is available for view without having to occupy addition display surface space to indicate such information is in fact available.

Although specific embodiments have been illustrated and described herein, it will be appreciated by those skilled in the art that any arrangement which is calculated to achieve the same purpose may be substituted for the specific embodiment of the present invention. This application is intended to cover any adaptations or variations of the present invention. Therefore, it is manifestly intended that this invention be limited only by the following claims and equivalents.

What is claimed is:

1. A computer comprising:
   a processor;
   a computer-readable medium;
   a display device; and
   at least one application program, each application program executed by the processor from the computer-readable medium, each program providing a primary view and a lenticular-like view over the display device; wherein a portion of the lenticular-like view and a portion of the primary view displayed are controlled by movement of a pointing device.

2. The computer of claim 1 wherein the lenticular-like view is slidably positioned over the primary view.

3. The computer of claim 1 wherein the display of the lenticular-like view is alternated with the primary view upon movement of the pointing device.

4. The computer of claim 1 wherein the lenticular-like view is created using multi-graphic image alteration.

5. The computer of claim 1 wherein the lenticular-like view is created using ghosting.

6. The computer of claim 1 wherein the primary view and the lenticular-like view simultaneously occupy the display device such that the primary view occupies a greater portion of the display device than the lenticular-like view.

7. The computer of claim 6 wherein the primary view and the lenticular-like view overlap to create a lenticular-like interface such that a portion of the overlapping views can be simultaneously observed.

8. The computer of claim 6 wherein slidably positioning the lenticular-like view over the primary view causes the lenticular-like view to occupy a greater portion of the display device than the primary view.

9. The computer of claim 1 wherein each application program provides for switching between the primary view and the lenticular-like view such that there is no overlap between the primary view and the lenticular-like view.

10. The computer of claim 9 wherein information in the primary view and in the lenticular-like view is surrounded by striping.

11. A method of displaying multiple images over a display device, comprising:
    displaying a primary field; and
    displaying a lenticular-like field; wherein a portion of the lenticular-like field and a portion of the primary field displayed are controlled by movement of a pointing device.

12. The method of claim 11 further comprising activating a pointing device to slidably position the lenticular-like field over the primary field.

13. The method of claim 11 wherein displaying the fields causes a portion of the primary field and a portion of the lenticular-like field to simultaneously occupy the display device.

14. The method of claim 11 wherein displaying the fields causes the primary field and the lenticular-like field to overlap to create a lenticular-like interface such that a portion of the overlapping views can be simultaneously observed.

15. A computer-readable medium having computer-executable instructions for performing a method comprising:
    displaying a plurality of primary viewing configurations on a display device;
    displaying a plurality of lenticular-like viewing configurations on the display device, wherein the lenticular-like viewing configurations correspond to the primary viewing configurations, and further wherein a portion of the lenticular-like viewing configurations and a portion of the primary viewing configurations displayed are controlled by movement of a pointing device.

16. The computer-readable medium of claim 15, wherein the method further comprises selecting a lenticular-like viewing configuration for slidably positioning over a corresponding primary viewing configuration.

17. The computer-readable medium of claim 15 wherein displaying a plurality of viewing configurations allows a portion of the primary viewing configurations and a portion of the lenticular-like viewing configurations to simultaneously occupy the display device.

18. The computer-readable medium of claim 15 wherein displaying a plurality of viewing configurations allows the primary and lenticular-like viewing configurations to overlap to create a lenticular-like interface wherein a portion of the overlapping views can be simultaneously observed.

19. A computerized system for displaying viewing configurations comprising:
    a display device;
    a plurality of primary viewing configurations;
    a plurality of lenticular-like viewing configurations; and
    a means for viewing on the display device the primary viewing configurations and the lenticular-like viewing configurations, wherein a portion of the lenticular-like viewing configurations and a portion of the primary viewing configurations displayed are controlled by movement of a pointing device.

20. The computerized system of claim 19 wherein each lenticular-like viewing configuration is slidably positioned over a corresponding primary viewing configuration by a pointing device.

21. The computerized system of claim 19 further comprises a means for simultaneously displaying on the display device a portion of a primary viewing configuration and a portion of a lenticular-like viewing configuration.

22. The computerized system of claim 19 further comprises a means for overlapping on the display device a primary viewing configuration and a lenticular-like viewing configuration to create a lenticular-like interface wherein a portion of the overlapping views can be simultaneously observed.

23. The computerized system of claim 19 further comprises a means for switching between the primary viewing configurations and the lenticular-like viewing configurations, wherein there is no overlap between the primary viewing configurations and the lenticular-like viewing configurations.

24. The computerized system of claim 23 wherein information in the primary viewing configurations and in the lenticular-like viewing configurations is surrounded by striping.

25. An information handling system comprising:

a display device; and a graphical user interface, wherein the graphical user interface is configured for viewing on the display device a primary view and a lenticular-like view;

wherein a portion of the lenticular-like view and a portion of the primary view displayed are controlled by movement of a pointing device.

26. The information handling system of claim 25 displays a portion of the contents of the lenticular-like view concurrently with the contents of the primary view such that the primary view occupies a greater portion of the display device than the lenticular-like view.

27. The information handling system of claim 25 wherein the contents of the lenticular-like view is slidably positioned over the contents of the primary view by a pointing device.

28. The information handling system of claim 27 wherein slidably positioning the lenticular-like view over the primary view causes the lenticular-like view to occupy a greater portion of the display device than the primary view.

29. The information handling system of claim 25 wherein the graphical user interface provides for switching between the primary view and the lenticular-like view such that there is no overlap between the primary view and the lenticular-like view.

30. The information handling system of claim 29 wherein information in the primary view and in the lenticular-like view is surrounded by striping.

* * * * *